No. 877,175. PATENTED JAN. 21, 1908.
S. C. DE FORE.
SPEED INDICATING APPARATUS.
APPLICATION FILED NOV. 30, 1906.
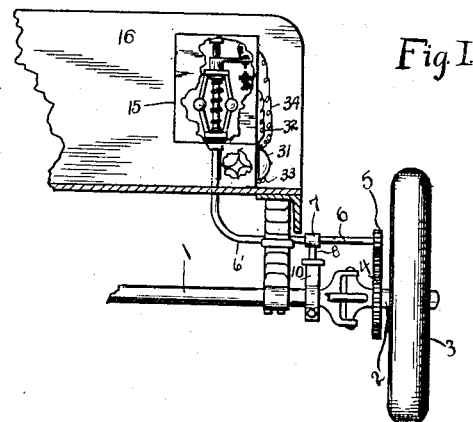
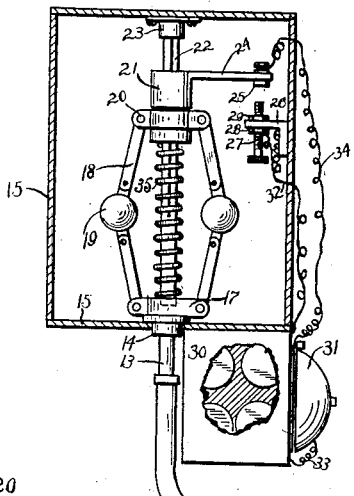
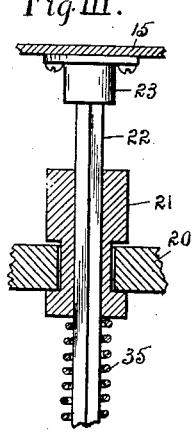
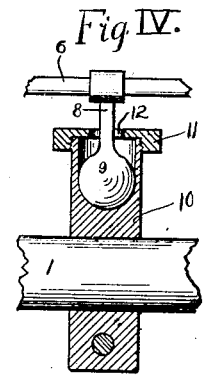
Witnesses:—
E. E. Seidelman
A. M. Maxwell
Inventor
Sylvester C. De Fore
By Arthur C. Brown
Atty

UNITED STATES PATENT OFFICE.

SYLVESTER C. DE FORE, OF KANSAS CITY, MISSOURI, ASSIGNOR TO STANDARD SPEEDOMETER COMPANY, A CORPORATION OF MISSOURI.

SPEED-INDICATING APPARATUS.

No. 877,175.      Specification of Letters Patent.      Patented Jan. 21, 1908.

Application filed November 30, 1906. Serial No. 345,606.

*To all whom it may concern:*

Be it known that I, SYLVESTER C. DE FORE, a citizen of the United States, residing at Kansas City, in the county of Jackson and State of Missouri, have invented certain new and useful Improvements in Speed-Indicating Apparatus; and I do declare the following to be a full, clear, and exact description of the invention, such as will enable others skilled in the art to which it appertains to make and use the same; reference being had to the accompanying drawings, and to the letters and figures of reference marked thereon, which form a part of this specification.

My invention relates to a speed indicating apparatus, and more particularly to an apparatus of that class for use with automobiles and like vehicles. My present invention being an improvement on the apparatus shown and described in my application for Letters Patent filed November 13, 1906, Serial No. 343,272.

It is the object of my invention to provide an apparatus which is so arranged and connected with the running gear or other parts of a vehicle such as an automobile, that a signal or indicator may be operated should the vehicle attain a certain speed, which is previously determined by regulation of a portion of the apparatus. The principal feature of the present invention being the means for closing a circuit to excite the indicator when the speed for which the device is set has been reached. In accomplishing this object, I have provided the improved details of structure which will presently be fully described and pointed out in the claims, reference being had to the accompanying drawings forming part of this specification, in which like reference numerals refer to like parts, and in which,—

Figure I is a view in elevation of the rear of the dash-board of an automobile, carrying the box in which a portion of the indicating apparatus is located, together with a portion of the front running gear, with parts connecting same with the indicator. Fig. II is a similar view of the inclosing box and contents, the former being in vertical section. Fig. III is an enlarged detail view in elevation of a portion of the governor shaft showing the collar carrying the upper governor arm. Fig. IV is an enlarged detail view of the joint on which the indicator shaft is supported.

Referring more in detail to the parts,—1 represents the front axle of a vehicle having a knuckle steering mechanism, the details of which are not fully illustrated as they form no part of my invention. On the hub 2 of wheel 3 carried by axle 1 is rigidly secured a spur wheel 4, and meshing with wheel 4 is a second wheel 5, keyed to a shaft 6 carried by and revolving in a bearing 7, supported by a standard 8, the lower end of which standard is enlarged to form a ball 9, and is seated in a pocket in a flange 10. Flange 10 is rigidly secured to axle 1, and has a cap 11, threaded on its upper end, which covers the pocket, but is provided with a central perforation 12, through which the standard 8 projects.

Secured to shaft 6 is a flexible shaft 6', which extends to and is rigidly connected with the shank 13 of a collar 14, which collar is supported by and revolubly mounted in the bottom of a box 15 carried by the dash-board 16 of the vehicle.

Rigidly secured to collar 14 is the lower cross bar 17 of a governor comprising the arms 18 and balls 19, the former of which are pivoted to the lower bar 17 and an upper bar 20, which latter is revolubly mounted in a groove in a collar 21, carried by a shaft 22, the lower end of which shaft is revolubly seated in a pocket in bar 17, while its upper end is keyed in a bracket 23 carried in the top of box 15.

The upper part of shaft 22 is preferably squared and collar 21 provided with a square perforation through which the shaft extends, so that the collar is prevented from revolution thereon. The lower end of shaft 22 is rounded so that it may set in the pocket in the bar 17, and will permit the revolution of said bar therearound.

On collar 21 is an arm 24 which extends outwardly almost to the side of box 15, and carries near its end a copper or like plug 25. Secured to the side of box 15, in line with arm 24 is a bracket 26 in which is adjustably secured in line with stud 25, a copper or like plug 27, the latter being preferably threaded and secured in bracket 26 by means of nuts 28 and 29 so that when desired, the plug may be turned forward or back to bring it nearer or further from the plug on arm 24. Secured in a suitable manner, adjacent to box 15 is a box 30, containing a battery and also secured adjacent to box 15 is an indicating device of a suitable nature, in this case shown to be a bell 31. 32 is a coil connecting stud 27 with the battery, 33 is a coil connecting the indicating device and battery and 34 is a coil connecting the indicating device and stud 25. 35 is a spring surrounding shaft 22 and tending to yieldingly spread the governor arms longitudinally.

When in use the parts are assembled in the manner described, and the stud 27, which has been marked to indicate various speeds, is set for the desired speed, the marking of the stud being made according to the strength of the spring 35. When the vehicle is traveling, the revolution of wheel 3 will carry the spur wheel on its hub around therewith, which wheel meshing with the small wheel on shaft 6, will cause said wheel and shaft to revolve, thereby revolving the flexible shaft, which is connected with the governor. As the speed of the vehicle is increased, the governor will revolve with increased rapidity, the weight of the balls spreading the governor arms, and drawing the upper collar downwardly against the tension of spring 35, the lower end of the governor being anchored against vertical movement by shaft 22. As the vehicle travels, the governor will be revolved and as the speed is increased, the increased rapidity of revolution of the governor will spread its arms outwardly, drawing the upper cross arm downwardly so that when the speed for which the device has been set has been attained, the plug 25 will have been carried down into contact with plug 27, completing a circuit through the indicating device, and operating the indicator which in this case would be the ringing of bell 31; when the driver will be warned of the speed at which he was traveling, and may, if desired, reduce the speed.

My apparatus is especially useful in cities or localities having laws or ordinances limiting speed at which a vehicle may travel.

Having thus described my invention, what I claim as new therein, and desire to secure by Letters Patent is,—

1. In a speed indicating apparatus, the combination with an indicating device, of a governor mechanism comprising a pair of jointed arms carrying weights, a base connecting the arms of said mechanism at one end, and having a recess in its inner surface, a shaft rigidly mounted at one end and having its loose end seated in said recess, a grooved collar carried by said shaft, and adapted for longitudinal but not for rotary movement, an arm connecting the other ends of said governor arms and adapted for revolution in the groove in said collar, a circuit terminal carried by said collar, a second terminal adjacent to and adapted for contact with said first terminal, and means for revolving said governor mechanism.

2. In a speed indicating apparatus, the combination with an indicating device, of a governor mechanism comprising a pair of jointed arms carrying weights, a base connecting the arms of said mechanism at one end, and having a recess in its inner surface, a shaft rigidly mounted at one end and having its loose end seated in said recess, a grooved collar carried by said shaft, and adapted for longitudinal but not for rotary movement, an arm connecting the other ends of said governor arms and adapted for revolution in the groove in said collar, a circuit terminal carried by said collar, a second terminal adjacent to and adapted for contact with said first terminal, means for adjusting said stationary terminal, a connection between each of said terminals and the indicating device, and means for revolving said governor mechanism.

In testimony whereof I affix my signature in presence of two witnesses.

SYLVESTER C. DE FORE.

Witnesses:
 A. M. MAXWELL,
 G. H. BROWN.